US008055380B1

(12) United States Patent
Verma et al.

(10) Patent No.: US 8,055,380 B1
(45) Date of Patent: Nov. 8, 2011

(54) DAILY PILL DISPENSING APPARATUS

(76) Inventors: Vandana Verma, Houston, TX (US); Ravindra Kumar, Houston, TX (US)

(*) Notice: Subject to any disclaimer, the term of this patent is extended or adjusted under 35 U.S.C. 154(b) by 61 days.

(21) Appl. No.: 12/628,351

(22) Filed: Dec. 1, 2009

(51) Int. Cl.
*G06F 17/00* (2006.01)

(52) U.S. Cl. .......... 700/242; 700/243; 221/90; 221/115; 221/124; 221/281; 221/15

(58) Field of Classification Search .................. 700/240, 700/242, 243; 221/97, 101, 112, 114, 115, 221/124, 90
See application file for complete search history.

(56) References Cited

U.S. PATENT DOCUMENTS

| | | | | |
|---|---|---|---|---|
| 3,762,601 | A * | 10/1973 | McLaughlin | 221/2 |
| 4,253,572 | A * | 3/1981 | Halbich | 206/538 |
| 4,717,042 | A * | 1/1988 | McLaughlin | 221/3 |
| 4,725,997 | A * | 2/1988 | Urquhart et al. | 368/10 |
| 5,044,516 | A | 9/1991 | Hoar | |
| 5,582,323 | A * | 12/1996 | Kurtenbach | 221/2 |
| 5,669,503 | A * | 9/1997 | Robin | 206/528 |
| 5,850,937 | A * | 12/1998 | Rauche | 221/2 |
| 6,102,855 | A * | 8/2000 | Kehr et al. | 600/300 |
| 6,169,707 | B1 * | 1/2001 | Newland | 368/10 |
| D451,666 | S | 12/2001 | Zastrow | |
| 6,415,202 | B1 | 7/2002 | Halfacre | |
| 6,449,218 | B1 * | 9/2002 | Lluch | 368/10 |
| 6,510,962 | B1 | 1/2003 | Vim | |
| 7,100,793 | B2 | 9/2006 | Baum | |
| 7,302,311 | B2 | 11/2007 | Varis | |
| D576,787 | S * | 9/2008 | Fulmer Mason | D3/203.3 |
| D619,351 | S * | 7/2010 | Verma et al. | D3/203.3 |
| 2008/0121645 | A1 * | 5/2008 | Jabr | 221/3 |
| 2009/0315702 | A1 * | 12/2009 | Cohen Alloro et al. | 340/539.1 |

* cited by examiner

*Primary Examiner* — Michael K Collins
(74) *Attorney, Agent, or Firm* — Crossley Patent Law; Mark A. Crossley

(57) ABSTRACT

The daily pill dispensing apparatus has a front section connected to a back section, a top hinge disposed on the top between the front section and the back section, a dispenser lid connected to the top hinge and pivotally covering the front section, a septet of top doors disposed atop the back section, each top door pivotally covering a separate compartment of the back section via the top hinge, a day indicia disposed atop each top door, a dispensing door hingedly separating each compartment from the front section, each dispensing door opening into the front section, a display disposed atop the dispenser lid, a controls disposed in the front section bottom, the controls in communication with the display and with each dispensing door, whereby each dispensing door sequentially opens, each dispensing door opening only one day per week, and battery power.

2 Claims, 4 Drawing Sheets

DAILY PILL DISPENSING APPARATUS

BACKGROUND OF THE INVENTION

Pill dispensers are well known in the crowded art field. One reason the field is so crowded is that users and medical professionals do not always find what they feel is needed. Another problem in the field is that many dispensing devices are simply too complex. Complexity leads to several problems, among which are more frequent device failures, production and sales costs, and user difficulties. Seldom is user difficulty better represented than with physically challenged users and aged users. Neither of these two groups is known for the desire or ability to operate complex devices, perform difficult programming, and fully understand usage. Alzheimer patients offer further example of typical aged users who are especially challenged by complex devices. What has been needed is a daily dispenser that is easily understood, requires only date settings, provides basic functions, operates for one week at a time, and prevents over dosages. The present apparatus provides these solutions.

FIELD OF THE INVENTION

The daily pill dispensing apparatus relates to pill dispensers and more especially to an automated pill dispenser that provides daily dispensing of tablets and capsules for a one week operational period.

SUMMARY OF THE INVENTION

The general purpose of the daily pill dispensing apparatus, described subsequently in greater detail, is to provide a daily pill dispensing apparatus which has many novel features that result in an improved daily pill dispensing apparatus which is not anticipated, rendered obvious, suggested, or even implied by prior art, either alone or in combination thereof.

To attain this, the daily pill dispensing apparatus is provided in a size that offers ease in portability while not being so small as to be easily misplaced, with a length of about 6 inches, a height of about 1½ inches, and a depth of about 4-5 inches. The top hinge is disposed on the top between the front section and the back section. The top hinge is importantly extended from the first end to the second end and thereby saves production costs by doubling as the hinge for the dispenser lid and for each of the top doors. The top doors provide for easy filling of daily dosages.

The spout is centrally located forwardly in the front section and thereby importantly allows a user to tip the apparatus forwardly downward and easily pour out the daily dosages that empty into the front section by the forwardly pivoting individual dispensing doors. The display is disposed atop the dispenser lid. The display indicates the date. The display can be set to flash upon an opening of each dispensing door, thereby reminding a user that medication is dispensed within the front section.

The apparatus importantly keeps programming to a minimum, so that a user can easily set the date and also the flash if desired, and so that a medical professional such as a doctor or pharmacist can easily and quickly perform settings also. The basic design of the apparatus provides dependability, low production costs and user friendly operation in filling, setting and delivery. The apparatus further importantly does not attempt to dispense medications requiring several daily doses. Mixing several daily doses and single daily doses has proven to be confusing and complex to many users. Other devices and methods may be used for dispensing multiple daily doses of medications.

Thus has been broadly outlined the more important features of the improved daily pill dispensing apparatus so that the detailed description thereof that follows may be better understood and in order that the present contribution to the art may be better appreciated.

An object of the daily pill dispensing apparatus is to provide automated daily tablet and capsule dispensing.

Another object of the daily pill dispensing apparatus is to prevent over dosages.

A further object of the daily pill dispensing apparatus is to provide basic function.

An added object of the daily pill dispensing apparatus is to be easily set.

And, an object of the daily pill dispensing apparatus is to provide dispensing in one week periods.

These together with additional objects, features and advantages of the improved daily pill dispensing apparatus will be readily apparent to those of ordinary skill in the art upon reading the following detailed description of presently preferred, but nonetheless illustrative, embodiments of the improved daily pill dispensing apparatus when taken in conjunction with the accompanying drawings.

In this respect, before explaining the current embodiments of the improved daily pill dispensing apparatus in detail, it is to be understood that the daily pill dispensing apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved daily pill dispensing apparatus. It is therefore important that the claims be regarded as including such equivalent constructions insofar as they do not depart from the spirit and scope of the daily pill dispensing apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the daily pill dispensing apparatus generally designated by the reference number 10 will be described.

Figure 1:
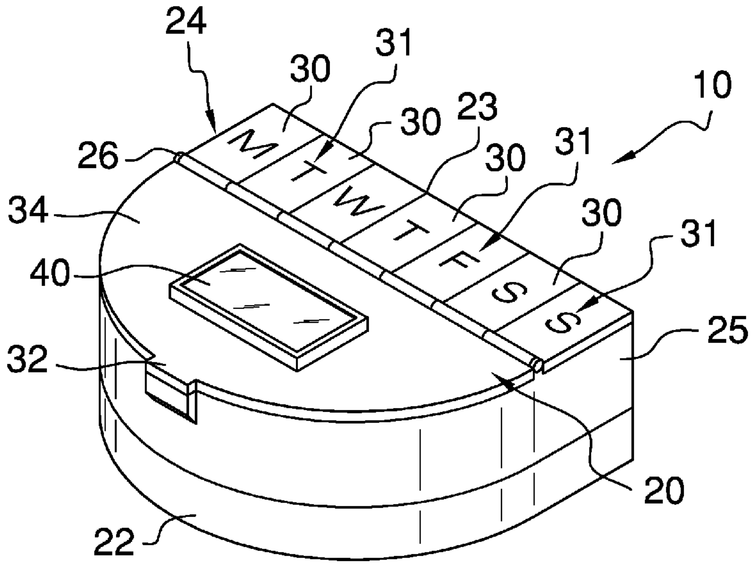
FIG. 1 is a top perspective view.
Figure 2:
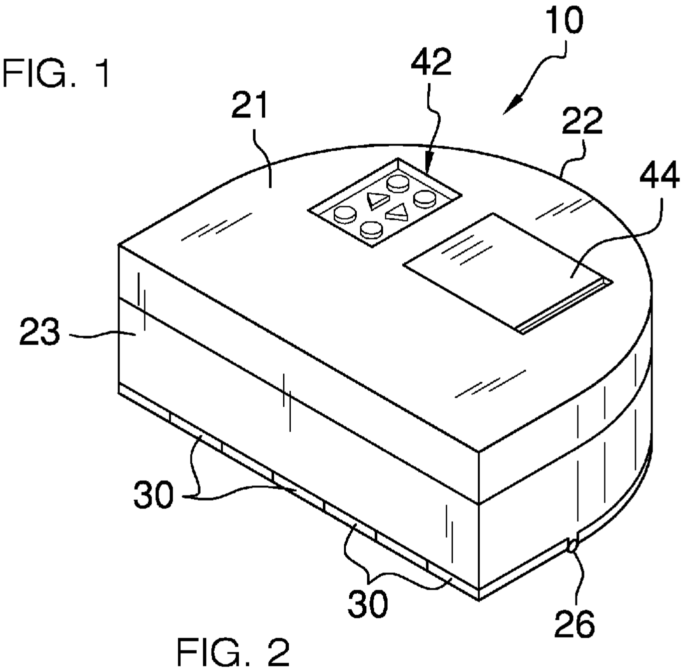
FIG. 2 is a bottom perspective view.

Referring to FIGS. 1 and 2, the apparatus 10 partially comprises a top 20 spaced apart from a bottom 21. The semicircular front section 22 is connected to the rectangular back section 23. The back section 23 has a first end 24 spaced apart from the second end 25. The front section 22 is smoothly melded into the back section 23.

Figure 4:
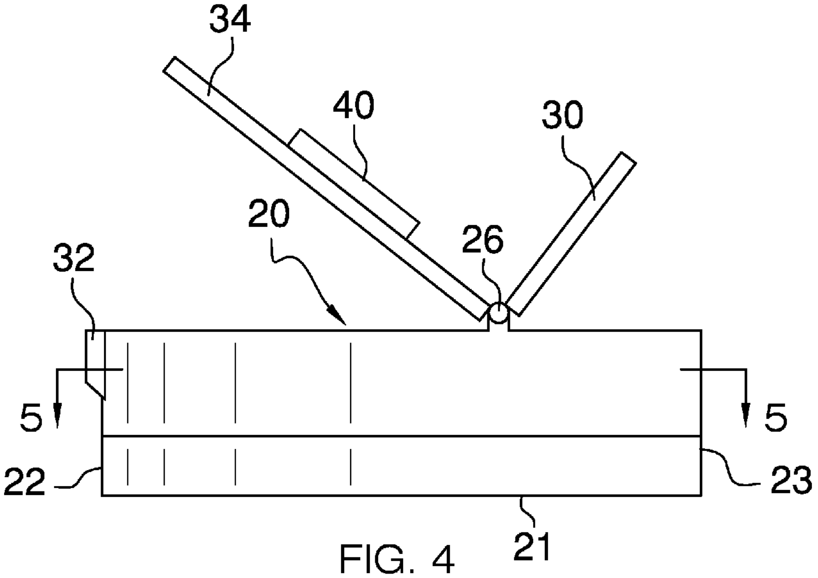
FIG. 4 is a second end elevation view.

Referring to FIG. 4, the top hinge 26 is disposed on the top 20 between the front section 22 and the back section 23. The top hinge 26 is extended from the first end 24 to the second end 25. The dispenser lid 34 is connected to the top hinge 26 and thereby pivotally covers the front section 22. The spout 32 is centrally located forwardly in the front section 22.

Figure 3:
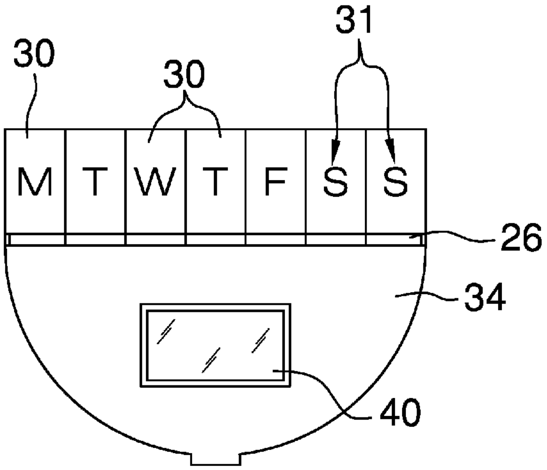
FIG. 3 is a top plan view.

Referring to FIG. 3, the septet of top doors 30 is disposed atop the back section 23. Each top door 30 pivotally covers a separate compartment 38 of the back section 23 via the top hinge 26. A day indicia 31 for each of the separate days of the week is disposed atop each top door 30.

Figure 5:
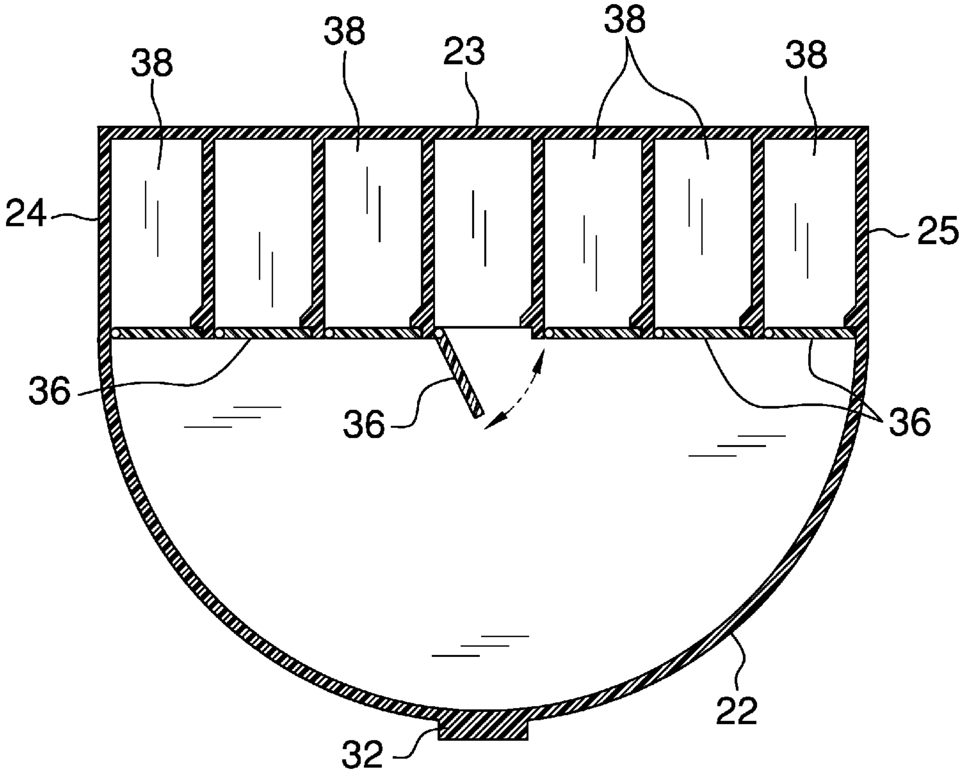
FIG. 5 is a cross sectional view of FIG. 4, taken along the line 5-5.
Figure 6:
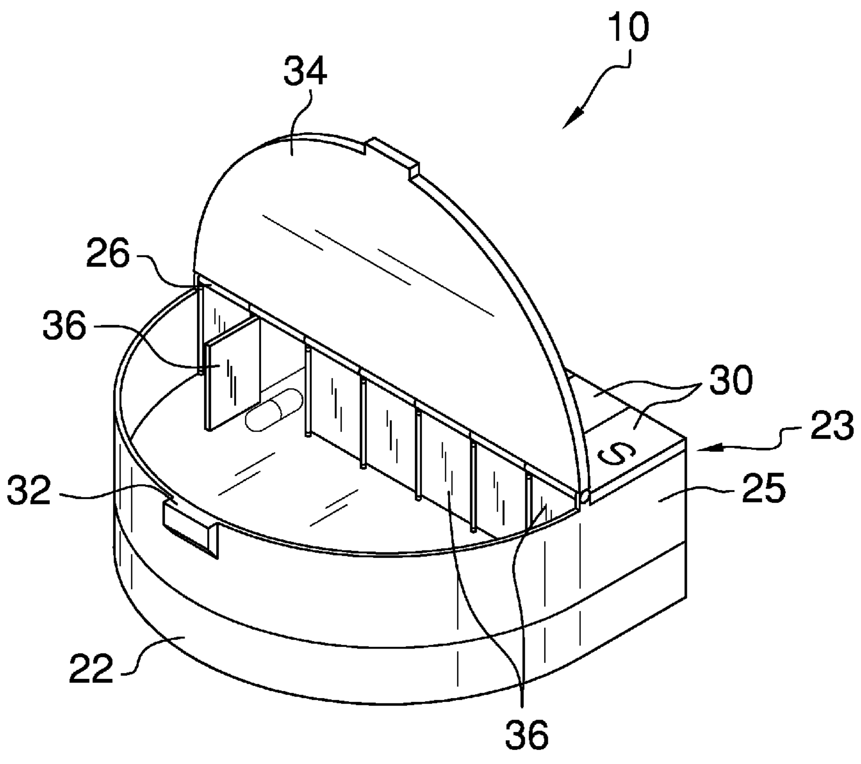
FIG. 6 is a top perspective view with dispenser lid open and one dispensing door open.

Referring to FIG. 5, a dispensing door 36 hingedly separates each compartment 38 from the front section 22. Each dispensing door 36 importantly opens into the front section 22 to ensure that pills and tablets fall into the front section 22.

Referring again to FIGS. 1 and 3, the display 40 is disposed atop the dispenser lid 34. The display 40 indicates the date. The display 40 can be set to flash upon an opening of each dispensing door 36.

Referring again to FIG. 2, the controls 42 are disposed in the front section 22 bottom 21. The controls 42 are in communication with the display 40 and with each dispensing door 36, whereby each dispensing door 36 sequentially opens, each dispensing door 36 opening only one day each week. The controls 42 provide for the setting capabilities described above. The battery compartment 44 is disposed in the front section 22 bottom 21. The battery compartment 44 is in communication with the controls 42.

With respect to the above description then, it is to be realized that the optimum dimensional relationships for the parts of the daily pill dispensing apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the daily pill dispensing apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the daily pill dispensing apparatus may be used.

Therefore, the foregoing is considered as illustrative only of the principles of the daily pill dispensing apparatus. Further, since numerous modifications and changes will readily occur to those skilled in the art, it is not desired to limit the daily pill dispensing apparatus to the exact construction and operation shown and described, and accordingly, all suitable modifications and equivalents may be resorted to, falling within the scope of the daily pill dispensing apparatus.

What is claimed is:

1. A daily pill dispensing apparatus, comprising, in combination:

a top spaced apart from a bottom;

a front section connected to a back section, the back section having a first end spaced apart from a second end;

a top hinge disposed on the top between the front section and the back section, the top hinge extended from the first end to the second end;

a dispenser lid connected to the top hinge and pivotally covering the front section;

a spout centrally located forwardly in the front section;

a plurality of top doors disposed atop the back section, each top door pivotally covering a separate compartment of the back section via the top hinge;

a day indicia disposed atop each top door, each indicia indicating a day of the week;

a dispensing door hingedly separating each compartment from the front section, each dispensing door opening into the front section;

a display disposed atop the dispenser lid;

a controls disposed in the front section bottom, the controls in communication with the display and with each dispensing door, whereby each dispensing door sequentially opens, each dispensing door opening only one day per week;

a battery compartment disposed in the front section bottom, the battery compartment in communication with the controls.

2. A daily pill dispensing apparatus, comprising, in combination:

a top spaced apart from a bottom;

a semicircular front section connected to a rectangular back section, the back section having a first end spaced apart from a second end;

a top hinge disposed on the top between the front section and the back section, the top hinge extended from the first end to the second end;

a dispenser lid connected to the top hinge and pivotally covering the front section;

a spout centrally located forwardly in the front section a septet of top doors disposed atop the back section, each top door pivotally covering a separate compartment of the back section via the top hinge;

a day indicia disposed atop each top door, each indicia indicating a separate day of the week;

a dispensing door hingedly separating each compartment from the front section, each dispensing door opening into the front section;

a display disposed atop the dispenser lid, the display indicating a date, the display flashing upon an opening of each dispensing door;

a controls disposed in the front section bottom, the controls in communication with the display and with each dispensing door, whereby each dispensing door sequentially opens, each dispensing door opening only one day each week;

a battery compartment disposed in the front section bottom, the battery compartment in communication with the controls.

* * * * *